US012583380B2

(12) United States Patent
Harmon et al.

(10) Patent No.: US 12,583,380 B2
(45) Date of Patent: Mar. 24, 2026

(54) FLEXIBLE LIGHTING SYSTEM

(71) Applicant: Ford Global Technologies, LLC, Dearborn, MI (US)

(72) Inventors: Michael John Harmon, Northville, MI (US); Andrew Brand, Bloomfield Township, MI (US); Alison Alexandra Palmer, Royal Oak, MI (US); Olivia Pan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/783,959

(22) Filed: Jul. 25, 2024

(65) Prior Publication Data

US 2026/0027965 A1 Jan. 29, 2026

(51) Int. Cl.
| | |
|---|---|
| *B60Q 1/24* | (2006.01) |
| *B60Q 1/00* | (2006.01) |
| *F21S 41/143* | (2018.01) |
| *F21S 41/153* | (2018.01) |
| *F21S 41/19* | (2018.01) |
| *F21V 21/30* | (2006.01) |
| *F21V 23/00* | (2015.01) |
| *F21Y 105/16* | (2016.01) |
| *F21Y 115/10* | (2016.01) |

(52) U.S. Cl.
CPC ........... *B60Q 1/247* (2022.05); *B60Q 1/0035* (2013.01); *F21S 41/192* (2018.01); *F21V 21/30* (2013.01); *F21V 23/001* (2013.01);

*F21S 41/143* (2018.01); *F21S 41/153* (2018.01); *F21Y 2105/16* (2016.08); *F21Y 2115/10* (2016.08)

(58) Field of Classification Search
CPC . B60Q 1/0035–247; F21S 41/143–192; F21V 21/30; F21V 23/001; F21Y 2105/16; F21Y 2115/10
See application file for complete search history.

(56) References Cited

U.S. PATENT DOCUMENTS

| | | | | |
|---|---|---|---|---|
| 4,363,084 | A * | 12/1982 | Dimiceli | F21V 21/10 362/249.11 |
| 4,894,755 | A | 1/1990 | Chandler | |
| 6,260,990 | B1 | 7/2001 | Saunders | |
| 10,029,611 | B2 * | 7/2018 | Harris | F21S 9/02 |
| 2017/0254106 | A1 | 9/2017 | Bruinsma | |
| 2020/0406986 | A1 | 12/2020 | Sosnowich et al. | |
| 2022/0349205 | A1* | 11/2022 | Fackler | F21V 21/15 |
| 2024/0125140 | A1 | 4/2024 | Fackler | |

\* cited by examiner

*Primary Examiner* — Jason M Han
(74) *Attorney, Agent, or Firm* — Vichit Chea; Carlson, Gaskey & Olds, P.C.

(57) ABSTRACT

An assembly includes a plurality of discrete light modules that are supported by a wall that at least partially surrounds a cargo area. Each light module is movable outward of the wall between a plurality of use positions. Each light module is selectively positionable to illuminate the cargo area or an area external to the cargo area.

23 Claims, 6 Drawing Sheets

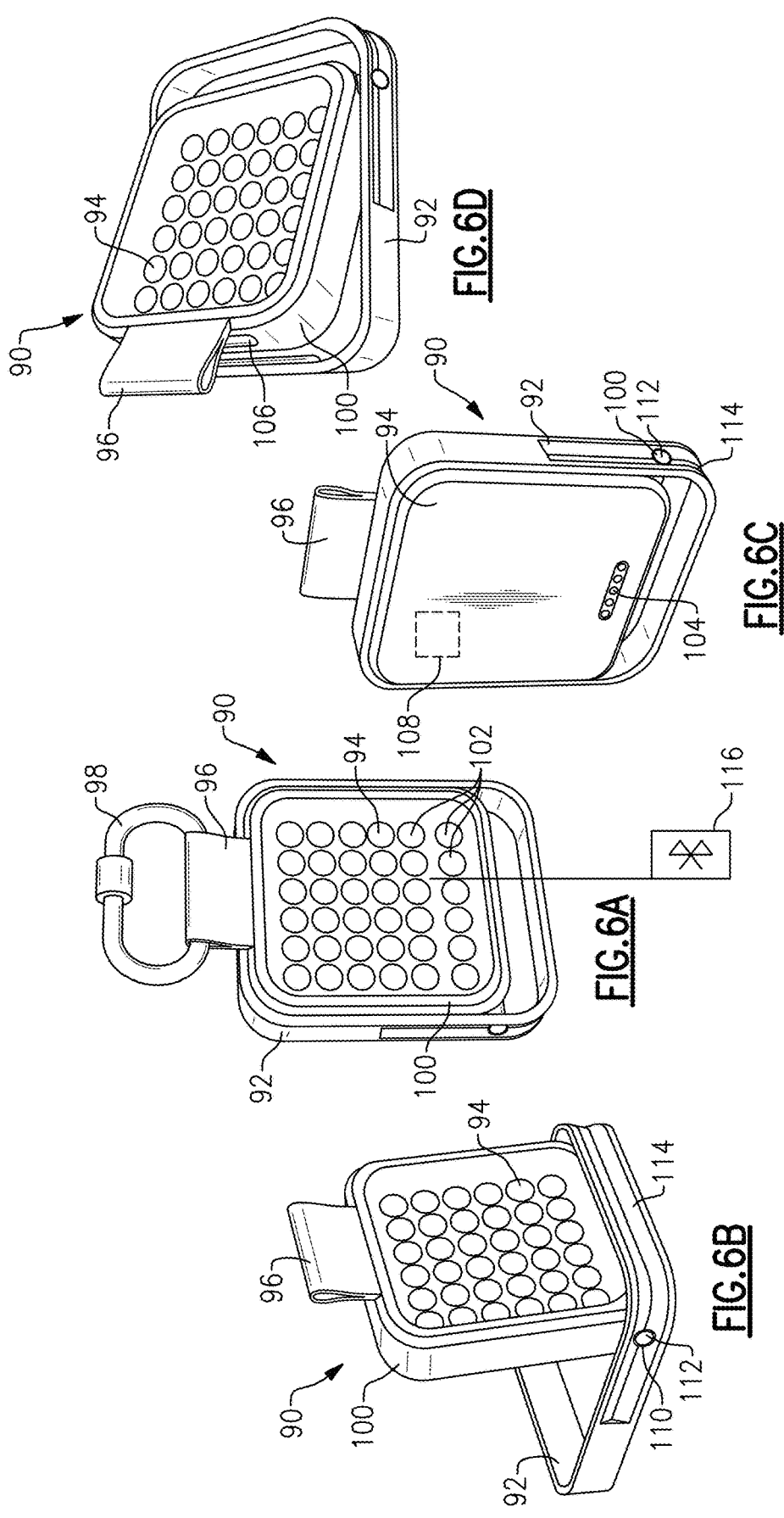

FLEXIBLE LIGHTING SYSTEM

TECHNICAL FIELD

This disclosure relates generally to a lighting system that is supported by a vehicle body structure, and which is configured to be easily adjustable to illuminate areas in and around a cargo bed area.

BACKGROUND

Vehicles such as pickup trucks for example, have a cargo bed that is used to transport different types of cargo. The cargo bed area may also serve as a work area or entertainment area for parties, tailgating, job site meetings, etc.

SUMMARY

An assembly according to an exemplary aspect of the present disclosure includes, among other things: a plurality of discrete light modules that are supported by a wall that at least partially surrounds a cargo area; each light module is movable outward of the wall between a plurality of use positions; and each light module is selectively positionable to illuminate the cargo area or an area external to the cargo area.

In a further non-limiting embodiment of any assembly, each light module includes a frame that supports a light source, and wherein the light source is pivotable within the frame.

In a further non-limiting embodiment of any assembly, the frame is supported on a swing arm that is pivotally connected to the wall.

In a further non-limiting embodiment of any assembly, the frame is pivotally connected to the swing arm.

In a further non-limiting embodiment of any assembly, a connecting cable is coupled to a power source, and wherein each light module includes an extendible power connection that is connected to the connecting cable, wherein the extendible power connection is movable between an extended position and a retracted position.

In a further non-limiting embodiment of any assembly, at least one light module of the plurality of discrete light modules is selectively removable from the wall.

In a further non-limiting embodiment of any assembly, each light module includes a removeable frame that supports a light source, and wherein the light source is pivotable within the removeable frame.

In a further non-limiting embodiment of any assembly, the removeable frame is moveable between a stowed position where the removeable frame surrounds the light source and a support position where the removeable frame comprises a base that supports the light source in an upright position where the light source has been pivoted out of the removeable frame.

In a further non-limiting embodiment of any assembly, the light source includes a charging interface that is selectively engageable with a vehicle charging interface in the wall.

In a further non-limiting embodiment of any assembly, the light source includes a pull tab or hang tab that extends outwardly of one edge of the light source.

A vehicle according to an exemplary aspect of the present disclosure includes, among other things: a cargo area surrounded by a plurality of walls, wherein at least one wall of the plurality of walls includes a wall surface that faces the cargo area; one or more recessed areas formed within the wall surface; and a plurality of light modules, wherein: each light module is received within one recessed area; each light module is movable outward of the wall surface between a plurality of use positions; and each light module is selectively positionable to illuminate the cargo area or an area external to the cargo area.

In a further non-limiting embodiment of any vehicle, each light module includes a frame that supports a light source, and wherein the light source is pivotable within the frame.

In a further non-limiting embodiment of any vehicle, the frame is supported on a swing arm that is pivotally connected to the at least one wall, and wherein the frame is pivotally connected to the swing arm.

In a further non-limiting embodiment of any vehicle, a connecting cable is coupled to a power source, and wherein each light module includes an extendible power connection that is connected to the connecting cable, wherein the extendible power connection is movable between an extended position and a retracted position.

In a further non-limiting embodiment of any vehicle, the one or more recessed areas are open to an upper surface of the at least one wall, and wherein the connecting cable extends along the at least one wall and connects adjacent light modules to each other, and including a cover that is selectively attached to an upper edge of the at least one wall to cover the connecting cable.

In a further non-limiting embodiment of any vehicle, the frame is selectively removeable from the one or more recessed areas, and wherein, once removed, the frame is moveable between a stowed position where the frame surrounds the light source and a support position where removeable frame comprises a base that supports the light source in an upright position where the light source has been pivoted out of the frame.

In a further non-limiting embodiment of any vehicle, the light source includes a charging interface that is selectively engageable with a vehicle charging interface in the at least one wall.

In a further non-limiting embodiment of any vehicle, the light source includes: a pull tab or hang tab that extends outwardly of one edge of the light source; and/or a communication interface to control light operation.

A method according to an exemplary aspect of the present disclosure includes, among other things: supporting a plurality of discrete light modules on a wall that at least partially surrounds a cargo area; selectively moving each light module outward of the wall between a plurality of use positions; and selectively positioning each light module to illuminate the cargo area or an area external to the cargo area.

In a further non-limiting embodiment of any method, each light module includes a frame that supports a light source, and the method includes selectively pivoting the light source within the frame.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 6A is a front perspective view of one of the removable light modules from the lighting system of FIG. 5A.

FIG. 6B is a perspective view of the light module of FIG. 6A in an upright position with kickstand support.

FIG. 6C is a rear perspective view of the light module of FIG. 6A.

FIG. 6D is a view of a top edge of the light module of FIG. 6A.

DETAILED DESCRIPTION

Vehicles such as pickup trucks for example, have a cargo bed may serve as a work area or entertainment area for parties, tailgating, job site meetings, etc. As these activities may occur at various times of the day, it is critical to provide better illumination both in the bed and around the vehicle during evening hours.

The subject disclosure details a lighting system where lighting modules are embedded within side wall surfaces of a truck bed in an inward facing display position, where each light module is adjustable between a plurality of different use positions, and in certain configurations the light modules may be selectively removable from the vehicle.

Figures 1A, 1B:
FIG. 1A is a perspective illustration of a vehicle with a plurality of light modules in a stowed position.
FIG. 1B shows the vehicle of FIG. 1A with the plurality of light modules in a deployed position.

FIGS. 1A-B show a vehicle 10 with a cargo area 12 defined by a first side wall 14 and a second side wall 16 facing opposite the first side wall 14. A passenger cab 18 is at a front of the vehicle and a front bed wall 20 extends along a back of the passenger cab between the first side wall 14 and the second side wall 16 to enclose a front end of the cargo area 12. A tailgate 22 is positioned at a rear of the vehicle 10 and is moveable between an open position and a closed position.

In implementations, a lighting system 24 includes a plurality of discrete light modules 26 that are supported by one or more of the walls 14, 16, 20 that surround the cargo area 12. Each light module 26 is separate from other modules and is movable outward of the respective wall 14, 16, 20 between a plurality of use positions. Additionally, each light module 26 is selectively positionable to illuminate the cargo area 12 or an area external to the cargo area 12.

In implementations, the light modules 26 are independently moveable between a stowed position and a deployed position. FIG. 1A shows the light modules 26 in the stowed position. FIG. 1B shows the light modules 26 in the deployed position.

Figure 2:
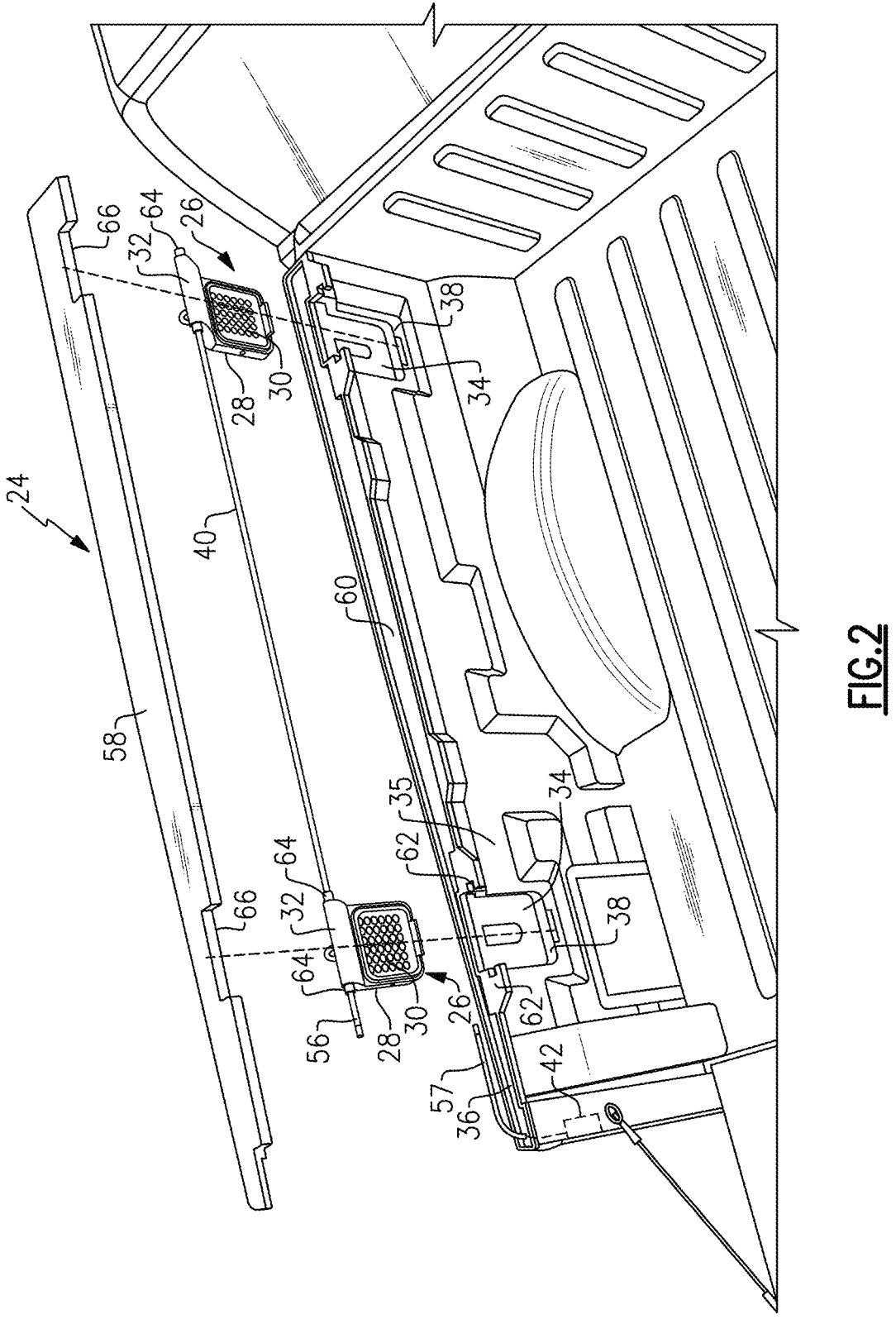
FIG. 2 is an exploded view of a lighting system from FIG. 1A.

In one example shown in FIG. 2, each light module 26 includes a frame 28 that supports a light source 30. In one example, the light source 30 comprises an LED array. A swing arm 32 may connect the frame 28 to the respective wall 14, 16, 20.

In implementations, one or more recessed areas 34 are formed within a wall surface of one or more of the walls 14, 16, 20. Each light module 26 is received within one recessed area 34. In one example, when stowed within the recessed areas 34, the light modules 26 are generally flush with an outer wall surface 35 of the respective wall 14, 16, 20. In one example, the recessed areas 34 are open to an upper surface 36 on a top edge of walls 14, 16, 20. In implementations, installation of the light modules 26 includes sliding each light module 26 downwardly into a selected recessed area 34 until a bottom of the light module contacts a stop surface 38 (see FIG. 2).

In implementations, a connecting cable 40 extends along the respective wall 14, 16, 20 and is coupled to a power source 42. In one example, each light module 26 includes an extendible power connection 44 (FIG. 3B) that is connected to the connecting cable 40. The extendible power connection 44 is movable between an extended position and a retracted position. In one example, the extendible power connection 44 comprises a pigtail connection having one end 46 connected to the light source 30 and an opposite end 48 extending through an opening 50 in the swing arm 32 to a power cord pigtail connector 52 that is connectable to the connecting cable 40. The pigtail connection has a coiled portion 54 that allows the extendible power connection 44 to move between the extended position and the retracted position.

In implementations, the connecting cable 40 connects adjacent light modules 26 to each other as shown in FIG. 2. In one example, the connecting cable 40 has a power connection 56 that connects to a tail light power module 42, which comprises the power source. A base vehicle power affordance 57 couples the power connection 56 to the tail light power module 42. In implementations, once the light modules 26 are installed in the recessed areas 34 and the power connections have been completed, a cover 58 is selectively attached to an upper edge of the respective wall 14, 16, 20 to cover the connecting cable 40 as shown in FIGS. 1A-1B. The cover 58 is selectively removable to expose loading areas, e.g., recessed areas 34, and connection interfaces for the light modules 26.

As shown in FIG. 2, a recessed trough basin 60 is provided along the upper edge of the walls to provide a nesting area for the cable 40.

In one example, each recessed area 34 includes a receiver slot 62 that receives ends 64 of the frame 28. This allows the frames 28 to snap into place while also providing pivotal interfaces to allow the light modules 26 to move outwardly of the wall surface 35 to one of various use positions.

In one example, the cover 58 includes recessed areas 66 that are aligned with each light module 26. This allows the swing arm 32 to pivot the light modules 26 upwardly to a use position that is above the upper edge of the walls 14, 16, 20 as shown in FIG. 1B.

Figures 3A, 3B, 3C:
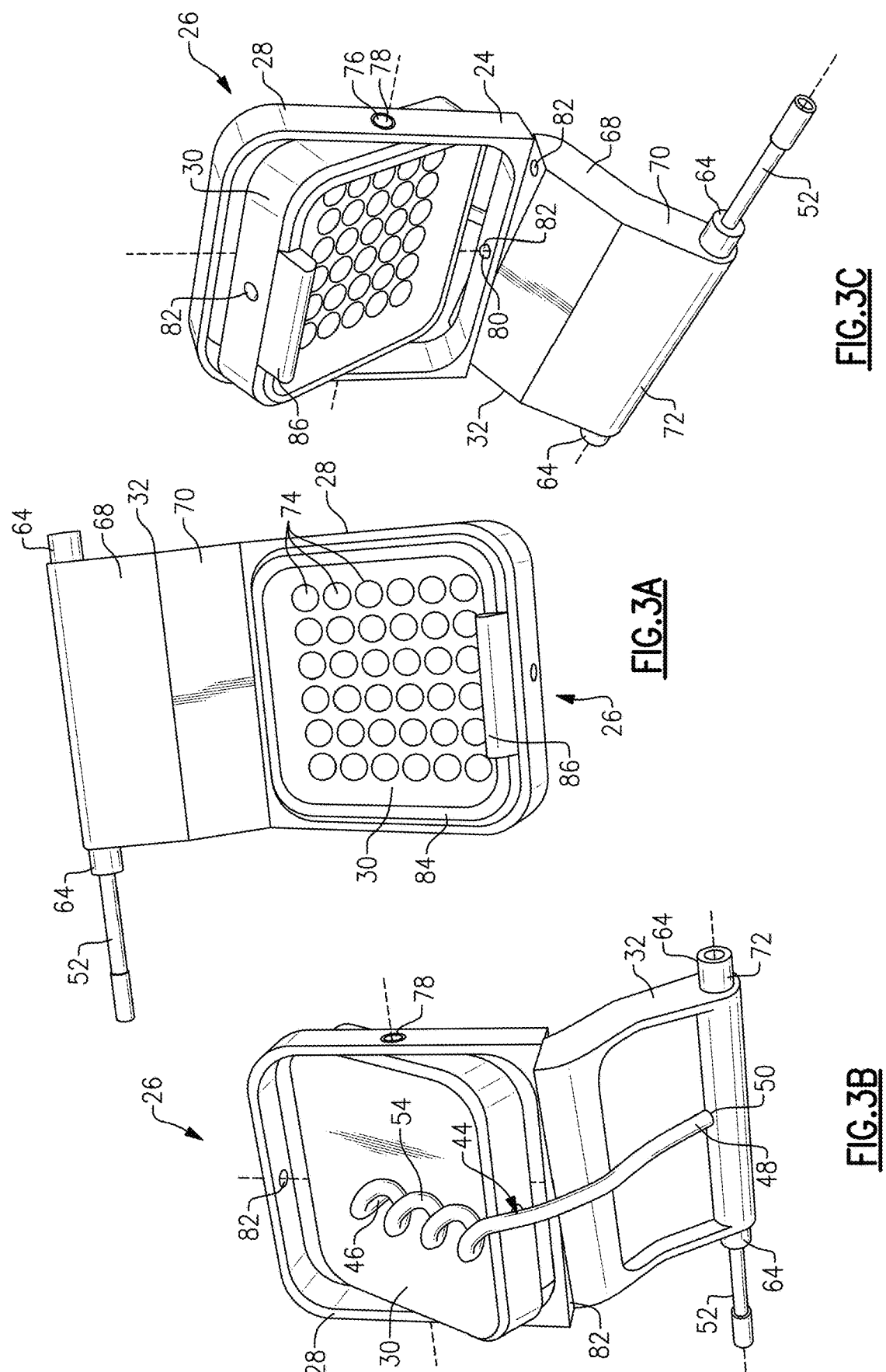
FIG. 3A is a front perspective view of one of the light modules from the lighting system of FIG. 1A.
FIG. 3B is a rear perspective view of the light module of FIG. 3A.
FIG. 3C is a top perspective view of the light module of FIG. 3A.

FIGS. 3A-C show an example of a light module. In implementations, the frame 28 is supported on the swing arm 32 that is pivotally connected to the respective wall 14, 16, 20 via pivot ends 64. In implementations, the swing arm 32 has a first portion 68 that is coupled to one edge of the frame 28 and a second portion 70 that is associated with a tubular edge portion 72 that includes the pivot ends 64. The connecting cable 40 extends through the tubular edge portion 72 to connect to the power cord pigtail connector 52. The first 68 and second 70 portions comprise generally flat plate portions that form an arm extension. The flat plate portions may be co-planar or offset from each other as best shown in FIG. 3C.

As shown in FIG. 3A, in one example the light source 30 is an LED array comprised of LEDs 74 arranged in a desired array pattern.

In implementations, the light source 30 is pivotable within the frame 28 as shown in FIGS. 3B and 3C. In this example, the frame 28 includes an opening 76 that receives a pivot shaft 78 that is associated with the light source 30.

In implementations, the frame 28 is pivotally connected to the swing arm 32. In one example, the frame 28 includes a pivot connection 80 as best shown in FIG. 3C.

In implementations, detent dimples 82 are used to selectively fix the light source 30 within the frame 28 and/or selectively fix the frame 28 to the swing arm 32. The dimples 82 comprises an interface where a dimple protrusion fits into a dimple recess when aligned with each other. The positions of the protrusions can either be on the frame or on the associated component, e.g., swing arm or light source, and recesses can be on the other of the frame or associated component. A manual input force is then used to selectively push the dimple protrusion out of the recess to allow the light source to be moved between different use positions.

Figure 4B:
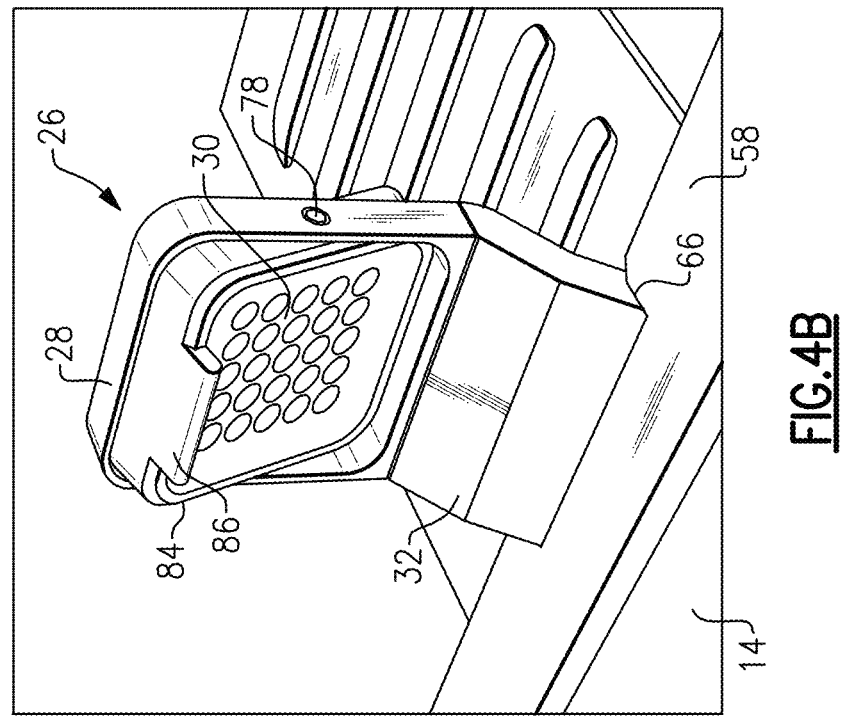
FIG. 4B is the light module of FIG. 4A in the deployed position.
Figure 4A:
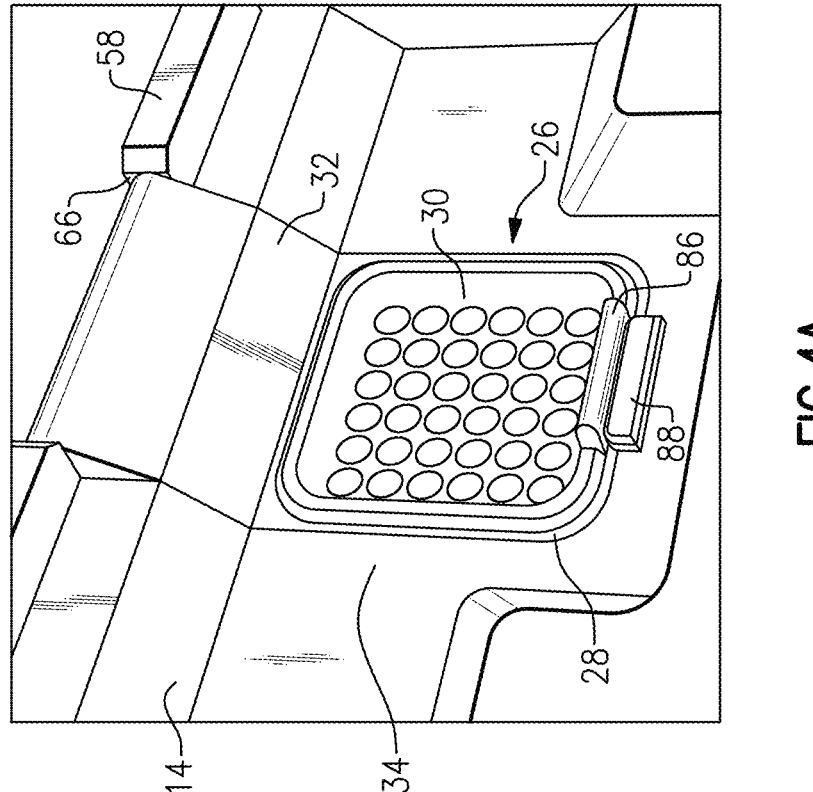
FIG. 4A is a perspective of the light module of FIG. 3A in a stowed position in a vehicle wall.

In implementations, the use positions may comprise any of the following in any combination: a stowed position facing inward toward the cargo area 12 as shown in FIG. 4A; a deployed position facing inward toward the cargo area 12; a deployed position facing outward away from the cargo area 12 as shown in FIG. 4B; any of various positions between the outward facing and inward facing positions.

In one example, the light source 30 includes an outer frame edge 84 with a finger pick or handle 86 that can be used to grasp the light source 30. The handle 86 can be used to facilitate movement of the light source 30 between the various use positions.

As shown in FIG. 4A, in implementations a retention clip 88 may be used to snap the light module 26 in the stowed position. In one example, the retention clip 88 is attached to or formed as part of the wall 14, 16, 20 and cooperates with the lower edge of the frame 28 underneath the handle 86.

Figure 5B:
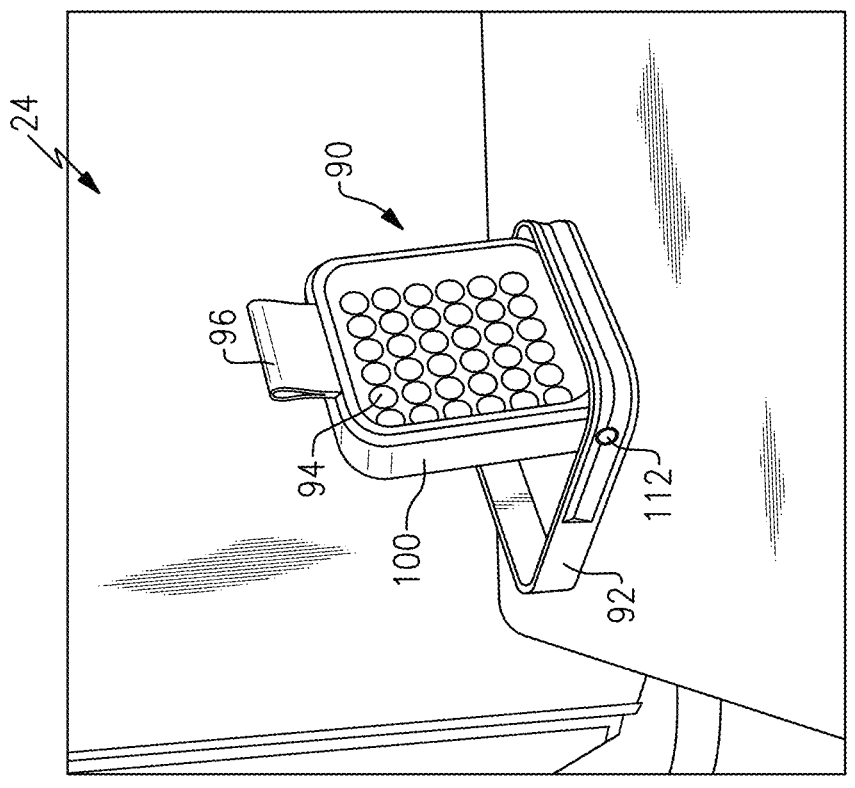
FIG. 5B is the light module of FIG. 5A in a removed position.
Figure 5A:
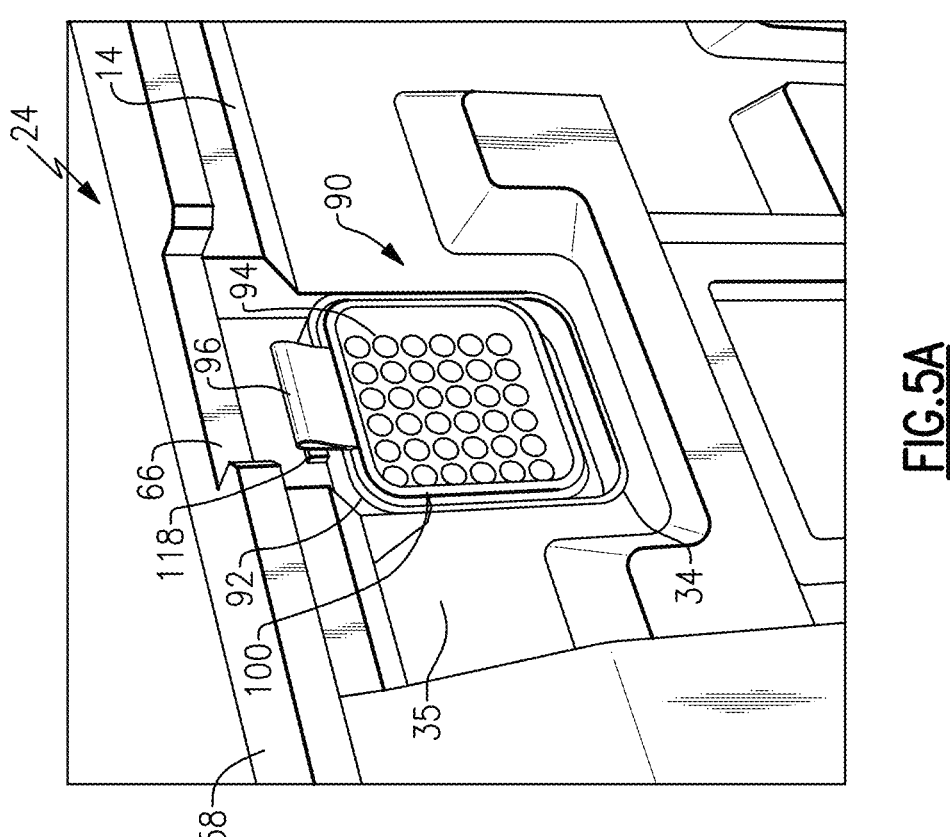
FIG. 5A is a perspective of an example of a selectively removable light module in a stowed position in a vehicle wall.

FIGS. 5A-5B show another example of a light module 90 as used in the lighting system 24. In this example, the light modules 90 are selectively removable from the vehicle 10.

In implementations, the light module 90 is moveable between a stowed position (FIG. 5A), where the module 90 is received within the recessed area 35s of the wall, and a removed position (FIG. 5B).

In implementations, each light module 90 includes a removeable frame 92 that supports a light source 94. In one example, the removeable frame 92 surrounds the light source 94 in a first position and the light source 94 is moveable relative to the frame 92 to achieve a second, support position where the removeable frame 92 comprises a base that supports the light source 94 in an upright, free-standing position (FIG. 5B).

In implementations, the light source 94 is pivotable within the removeable frame 92. In one example, when in the upright position, the light source 90 has been pivoted out of the removeable frame 28. In this example, the frame 92 serves a kickstand function.

FIGS. 6A-D shown one example of a light module 90. In one example, the light module 90 includes a pull tab or hang tab 96 as shown in FIG. 6A. This tab 96 can be used to pull the module 90 out of the vehicle and move the light source

94 to a desired position relative to the frame 92. Optionally, the tab 96 can be associated with another component, such as a carabiner 98, for example, which can be used to hang the light module 90.

In implementations, the light source 94 comprises an LED array as described above. In one example, the light source 94 includes an outer frame 100 that surrounds a plurality of LEDs 102. In one example, the tab 96 extends outwardly of one edge of the frame 100 of the light source 94.

As discussed above, once the tab 96 has been used to remove/pull the light module 90 out of the recessed area 34, the light source 94 can be pivoted relative to the frame 92 to the upright, kickstand position, e.g. a free standing position, as shown in FIG. 6B. In this position, the light source 30 can be moved to any desired location to illuminate a work or entertainment area that is outside the vehicle.

In implementations, the frame 92 includes an opening 110 that receives a shaft 112 on the frame 100 of the light source 94.

In implementations, the light source 94 includes a charging interface 104 (FIG. 6C) that is selectively engageable with a vehicle charging interface in the wall 14, 16, 20. In one example, the charging interface 104 comprises a plurality of charging pins that are spring loaded. The pins meet rating requirements for moisture and dust, and are configured to charge an internal battery 108 of the module 90 when in the stowed position and provide remote input when docked.

In implementations, the light module 90 includes detent dimples/recesses 106 (FIG. 6D) in the frame 92 and/or light source 94 to allow the light source 94 to snap into place for alignment and stowing purposes.

In implementations, the light module 90 includes alignment grooves 114 that are formed in the frame 92. These allow for the module 90 to be easily slid into the recessed area 34 for the stowed position, and further facilitate a secure fit.

In implementations, the light module 90 includes a communication interface 116, e.g. Bluetooth, that can allow lights to be controlled via an app from an input device such as a smart device or vehicle touchscreen, for example.

As shown in FIG. 5A, in implementations, a retention clip 118 may be used to snap the light module 90 in the stowed position. In one example, the retention clip 118 is attached to or formed as part of the wall 14, 16, 20 and cooperates with an upper edge of the frame 92 behind the tab 96.

In one example, a method includes: supporting a plurality of discrete light modules on a wall that at least partially surrounds a cargo area; selectively moving each light module outward of the wall between a plurality of use positions; and selectively positioning each light module is to illuminate the cargo area or an area external to the cargo area.

The method may also include selectively pivoting the light source within the frame.

The subject disclosure provides a system where, in one configuration, light modules with dedicated power are embedded in a bed side wall are mounted to arms which can rotate to swing up and over the bed side wall. The modules can be positioned to aim bed inward or bed outward to illuminate the space around the vehicle. The modules are manually manipulated with three pivot points of rotation for maximum aim flexibility. The system is designed with dedicated power so there is no need to charge the lighting modules.

The subject disclosure also provides a system where, in another configuration, light modules are removable from the vehicle and include internal batteries. A frame around the light module aids in securely stowing the modules within a bed wall, while also allowing a light source to rotate such that the frame becomes a kickstand to allow the module to free stand. Additionally a looped pull tab can support hanging of the module if desired. The module is charged via spring loaded pins which would cooperate with a vehicle charging interface within the walls of the bed.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly, comprising:
a plurality of discrete light modules that are receivable within recessed areas formed within one or more walls that at least partially surround a cargo area;
each light module is movable outward of the one or more walls between a plurality of use positions;
each light module is selectively positionable to illuminate the cargo area or an area external to the cargo area;
each light module includes a frame that surrounds and supports a light source, and wherein the light source is pivotable within the frame, and wherein the light source and frame are received within one of the recessed areas when in a stowed position; and
wherein the frame is supported on a swing arm that is pivotally connected to the one or more walls.

2. The assembly of claim 1, wherein the frame is pivotally connected to the swing arm.

3. The assembly of claim 1, including a connecting cable coupled to a power source, and wherein each light module includes an extendible power connection that is connected to the connecting cable, wherein the extendible power connection is movable between an extended position and a retracted position.

4. The assembly of claim 1, wherein at least one light module of the plurality of discrete light modules is selectively removable from an associated recessed area formed within the one or more walls.

5. The assembly of claim 4, wherein each light module includes a removeable frame that surrounds and supports a light source, and wherein the light source is pivotable within the removeable frame such that the light source is moveable relative to all sides of the removeable frame.

6. The assembly of claim 5, wherein the removeable frame is moveable between a stowed position where the removeable frame surrounds the light source and a support position where the removeable frame comprises a base that supports the light source in an upright position where the light source has been pivoted out of the removeable frame.

7. The assembly of claim 5, wherein the light source includes a charging interface that is selectively engageable with a vehicle charging interface in the one or more walls.

8. The assembly of claim 1, wherein at least some of the recessed areas are open to the cargo area and are open to an upper surface on a top edge of the one or more walls that includes the recessed areas, and wherein at least one discrete light module of the plurality of discrete light modules is slidable in a downward direction into the one or more walls to be received within an associated recessed area.

9. An assembly, comprising:
a plurality of discrete light modules that are receivable within recessed areas formed within one or more walls that at least partially surround a cargo area, and wherein at least one light module of the plurality of discrete light modules is selectively removable from an associated recessed area formed within the one or more walls;
each light module is movable outward of the one or more walls between a plurality of use positions; and
each light module is selectively positionable to illuminate the cargo area or an area external to the cargo area;
wherein each light module includes a removeable frame that surrounds and supports a light source, and wherein the light source is pivotable within the removeable frame such that the light source is moveable relative to all sides of the removeable frame;
wherein the light source includes a pull tab or hang tab that extends outwardly of one edge of the light source, and wherein:
the pull tab or hang tab is pullable to take at least one discrete light module of the plurality of discrete light modules out of a vehicle with the cargo area;
the light source is pullable by pull tab or hang tab to move the light source to a desired position relative to the removeable frame; and/or
the pull tab or hang tab is useable with another component to hang the at least one discrete light module in a desired location.

10. A vehicle comprising:
a cargo area surrounded by a plurality of walls, wherein at least one wall of the plurality of walls includes a wall surface that faces the cargo area;
one or more recessed areas formed within the wall surface; and
a plurality of light modules, wherein:
each light module is received within one recessed area;
each light module is movable outward of the wall surface between a plurality of use positions;
each light module is selectively positionable to illuminate the cargo area or an area external to the cargo area;
each light module includes a frame that supports a light source, wherein the light source is pivotable within the frame; and
the light source and frame are received within one of the recessed areas when in a stowed position.

11. The vehicle of claim 10, wherein the frame is supported on a swing arm that is pivotally connected to the at least one wall, and wherein the frame is pivotally connected to the swing arm.

12. The vehicle of claim 11, including a connecting cable coupled to a power source, and wherein each light module includes an extendible power connection that is connected to the connecting cable, wherein the extendible power connection is movable between an extended position and a retracted position.

13. The vehicle of claim 12, wherein the one or more recessed areas are open to an upper surface of the at least one wall, and wherein the connecting cable extends along the at least one wall and connects adjacent light modules to each other, and including a cover that is selectively attached to an upper edge of the at least one wall to cover the connecting cable.

14. The vehicle of claim 10, wherein the frame is selectively removeable from the one or more recessed areas, and wherein, once removed, the frame is moveable between a stowed position where the frame surrounds the light source and a support position where removeable frame comprises a base that supports the light source in an upright position where the light source has been pivoted out of the frame.

15. The vehicle of claim 14, wherein the light source includes a charging interface that is selectively engageable with a vehicle charging interface in the at least one wall.

16. The vehicle of claim 14, wherein the light source includes:

a pull tab or hang tab that extends outwardly of one edge of the light source; and/or a communication interface to control light operation.

17. The vehicle of claim 10, wherein each light module is moveable between a stowed position and a deployed position, and wherein at least one light module of the plurality of light modules is received within the one or more recessed areas when in the stowed position.

18. The vehicle of claim 17, wherein, when in the stowed position, the plurality of light modules are generally flush with the wall surface.

19. The vehicle of claim 10, wherein at least one recessed area of the one or more recessed areas is open to the cargo area and is open to an upper surface on a top edge of the at least one wall of the plurality of walls, and wherein at least one light module of the plurality of light modules is slidable in a downward direction into the at least one wall to be received within the at least one recessed area.

20. A method comprising:

supporting a plurality of discrete light modules within recessed areas formed within one or more walls that at least partially surrounds a cargo area;

selectively moving each light module outward of an associated wall between a plurality of use positions;

selectively positioning each light module to illuminate the cargo area or an area external to the cargo area;

inserting each light module into an associated recessed area to return each light module to a stowed position;

surrounding each light module with a frame that supports a light source, wherein the light source is pivotable within the frame;

receiving the light source and frame within one of the recessed areas when in the stowed position; and supporting the frame on a swing arm that is pivotally connected to the one or more walls.

21. The method of claim 20, wherein each light module includes a frame that surrounds a light source, wherein the frame is a separate component from the light source, and including selectively pivoting the light source within the frame with all sides of the frame being moveable relative to the light source, and inserting the light source and frame within one of the recessed areas to provide a stowed position.

22. The method of claim 21, wherein the frame comprises a removeable frame with a support portion, and including removing the removeable frame from the one or more walls of the cargo area and supporting the light source on the support portion to provide an upright, free-standing position for the light source.

23. A method comprising:

supporting a plurality of discrete light modules within recessed areas formed within one or more walls that at least partially surrounds a cargo area;

selectively moving each light module outward of an associated wall between a plurality of use positions;

selectively positioning each light module to illuminate the cargo area or an area external to the cargo area;

inserting each light module into an associated recessed area to return each light module to a stowed position;

surrounding each light module with a frame that supports a light source, wherein the frame is a separate component from the light source;

selectively pivoting the light source within the frame with all sides of the frame being moveable relative to the light source;

inserting the light source and frame within one of the recessed areas to provide a stowed position;

wherein at least one discrete light module of the plurality of discrete light modules includes a pull tab or hang tab and including:

pulling the pull tab or hang tab to take the at least one discrete light module out of a vehicle with the cargo area and move the light source to a desired position relative to the frame; and/or using the pull tab or hang tab with another component to hang the at least one discrete light module in a desired location.

* * * * *